US011012989B2

(12) United States Patent
Ko et al.

(10) Patent No.: US 11,012,989 B2
(45) Date of Patent: May 18, 2021

(54) METHOD AND APPARATUS FOR SENDING SIGNAL OF UNDERWATER COMMUNICATION

(71) Applicant: Hoseo University Academic Cooperation Foundation, Asan-Si (KR)

(72) Inventors: Hak Lim Ko, Anyang-si (KR); Yong Ho Cho, Yuseong-Gu (KR); Tae Ho Im, Cheonan-Si (KR)

(73) Assignee: HOSEO UNIVERSITY ACADEMIC COOPERATING FOUNDATION, Asan-si (KR)

( * ) Notice: Subject to any disclaimer, the term of this patent is extended or adjusted under 35 U.S.C. 154(b) by 0 days.

(21) Appl. No.: 16/488,100

(22) PCT Filed: Jan. 12, 2018

(86) PCT No.: PCT/KR2018/000583
§ 371 (c)(1),
(2) Date: Aug. 22, 2019

(87) PCT Pub. No.: WO2018/155818
PCT Pub. Date: Aug. 30, 2018

(65) Prior Publication Data
US 2019/0387509 A1    Dec. 19, 2019

(30) Foreign Application Priority Data

Feb. 23, 2017    (KR) .................. 10-2017-0024012

(51) Int. Cl.
*H04W 72/04*    (2009.01)
*H04B 13/02*    (2006.01)

(52) U.S. Cl.
CPC ..... *H04W 72/042* (2013.01); *H04W 72/0453* (2013.01); *H04B 13/02* (2013.01)

(58) Field of Classification Search
CPC ............ H04W 72/042; H04W 72/0453; H04B 13/02; H04B 11/00; H04B 7/26; Y02D 30/70
See application file for complete search history.

(56) References Cited

U.S. PATENT DOCUMENTS 5,432,754 A * 7/1995 Brady .................... H04B 11/00
                                                                367/134
8,233,801 B2 * 7/2012 Sexton ................... H04B 11/00
                                                                398/104

(Continued)

FOREIGN PATENT DOCUMENTS

| KR | 100912825 | 8/2009 |
| KR | 1020100052318 | 5/2010 |
| KR | 1020150059589 | 6/2015 |

OTHER PUBLICATIONS

International Search Report and Written Opinion dated Apr. 11, 2018 for PCT Application PCT/KR2018/000583.

(Continued)

*Primary Examiner* — Jung H Park

(74) *Attorney, Agent, or Firm* — Stradley Ronon Stevens & Young, LLP

(57) ABSTRACT

The present invention relates to underwater communication and, more particularly to a signal transmission method and device which configure and transmit physical channel information such that low-power control is performed in underwater communication. The present invention configures the physical channel information such that a reception node side can check through a combination of preambles whether a signal is provided to itself, when forward direction communication is performed in a centralized underwater communication network. Therefore, the present invention performs the control such that only a relevant reception node requiring data reception performs a demodulation operation, without requiring all reception nodes to always perform demodula- (Continued)

tion in a forward direction communication process. Through this process, many reception nodes do not perform unnecessary demodulation operations in the forward direction communication process, thereby providing an effect of preventing unnecessary power consumption.

7 Claims, 12 Drawing Sheets

(56) References Cited

U.S. PATENT DOCUMENTS

| | | | |
|---|---|---|---|
| 9,031,413 B2* | 5/2015 | Doniec | H04B 10/80 398/104 |
| 2010/0027449 A1 | 2/2010 | Kim et al. | |
| 2011/0096797 A1 | 4/2011 | Zhang et al. | |
| 2013/0215772 A1 | 8/2013 | Kaur et al. | |
| 2016/0127042 A1* | 5/2016 | Farr | H04B 10/11 398/104 |
| 2018/0145771 A1* | 5/2018 | Melodia | H04B 13/02 |

OTHER PUBLICATIONS

Korean Office Action from corresponding Korean Patent Application No. 10-2017-0024012 dated Oct. 17, 2019.

* cited by examiner

[FIG. 1]
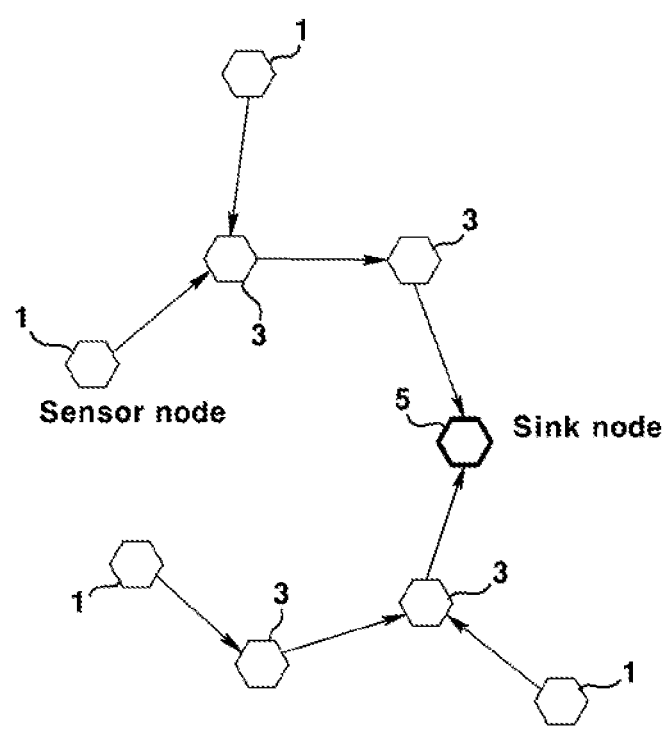

[FIG. 2]
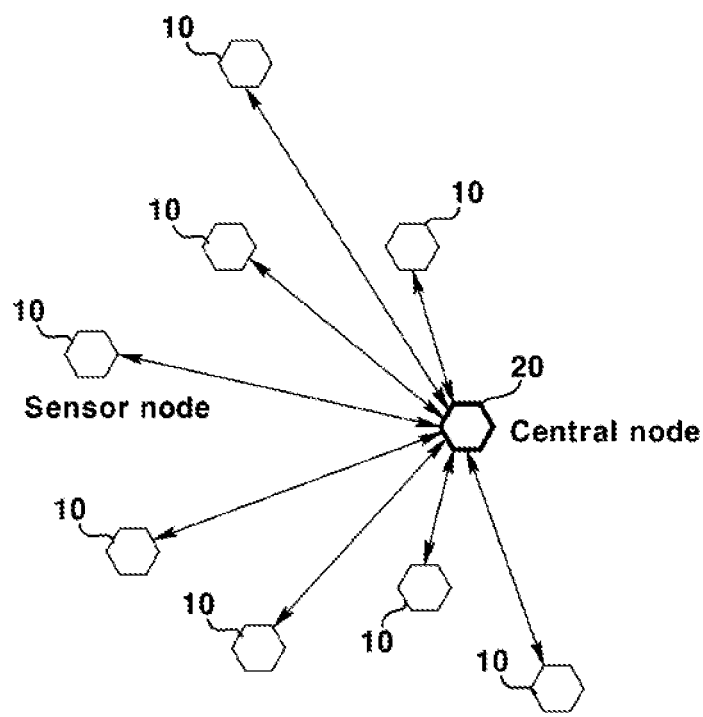
[FIG. 3]
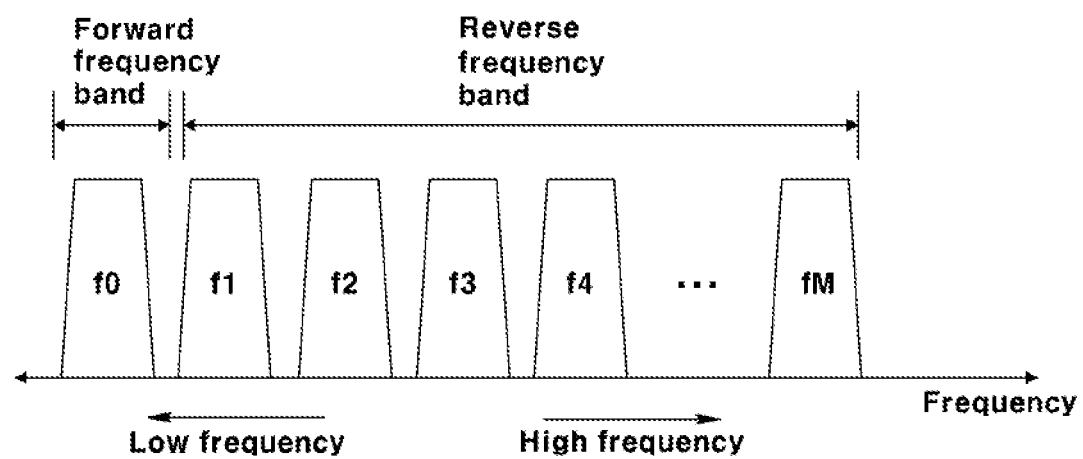

[FIG. 4]
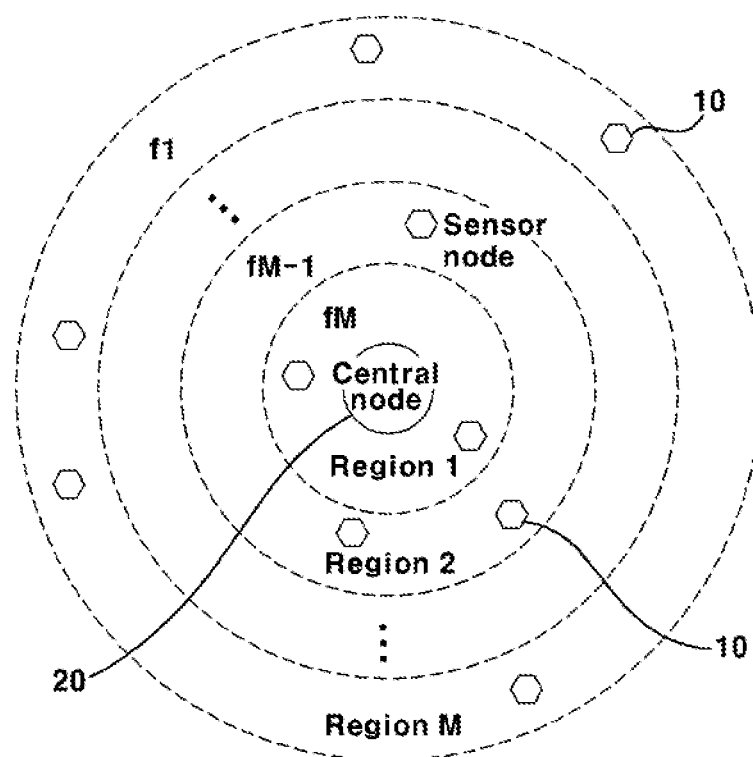

[FIG. 5]
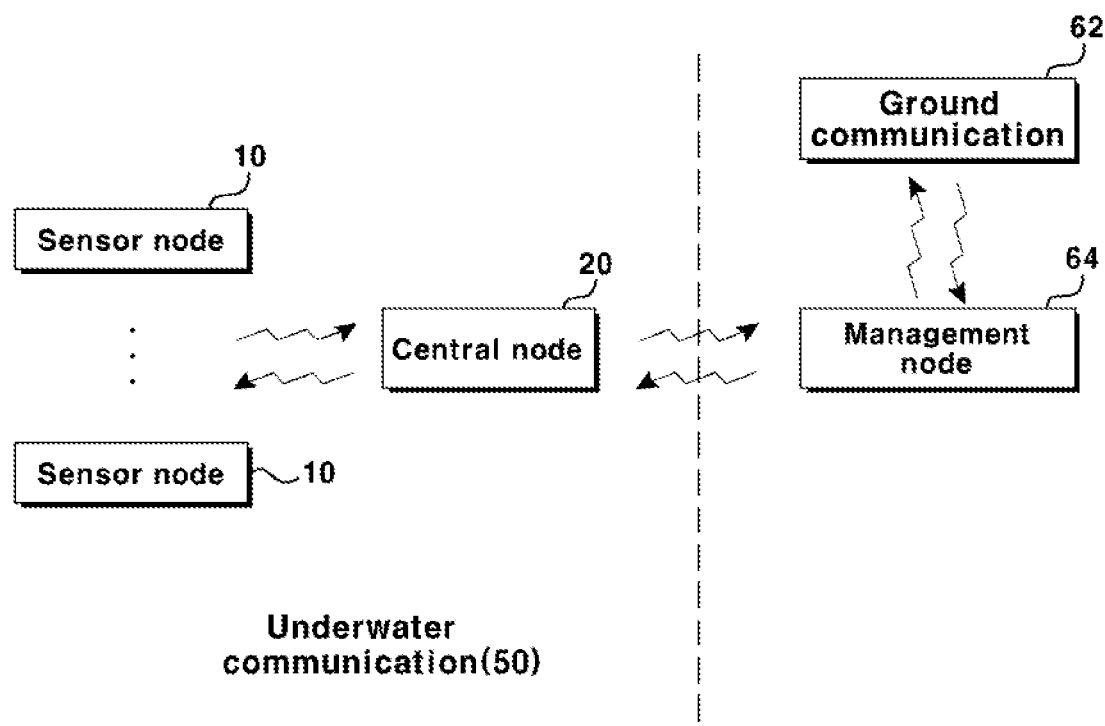

[FIG. 6]
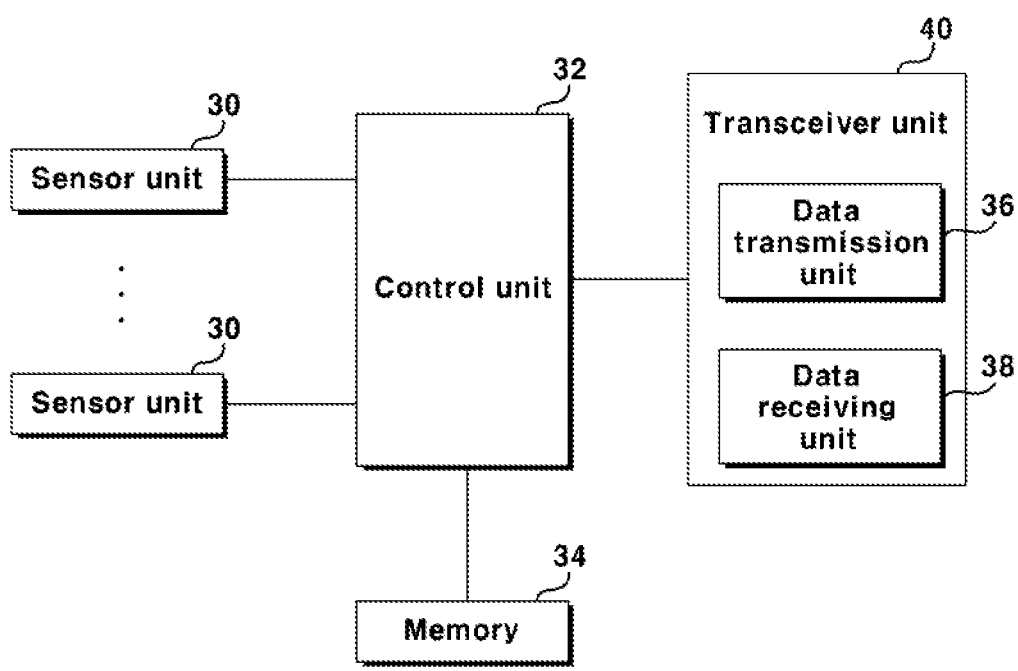

[FIG. 7]
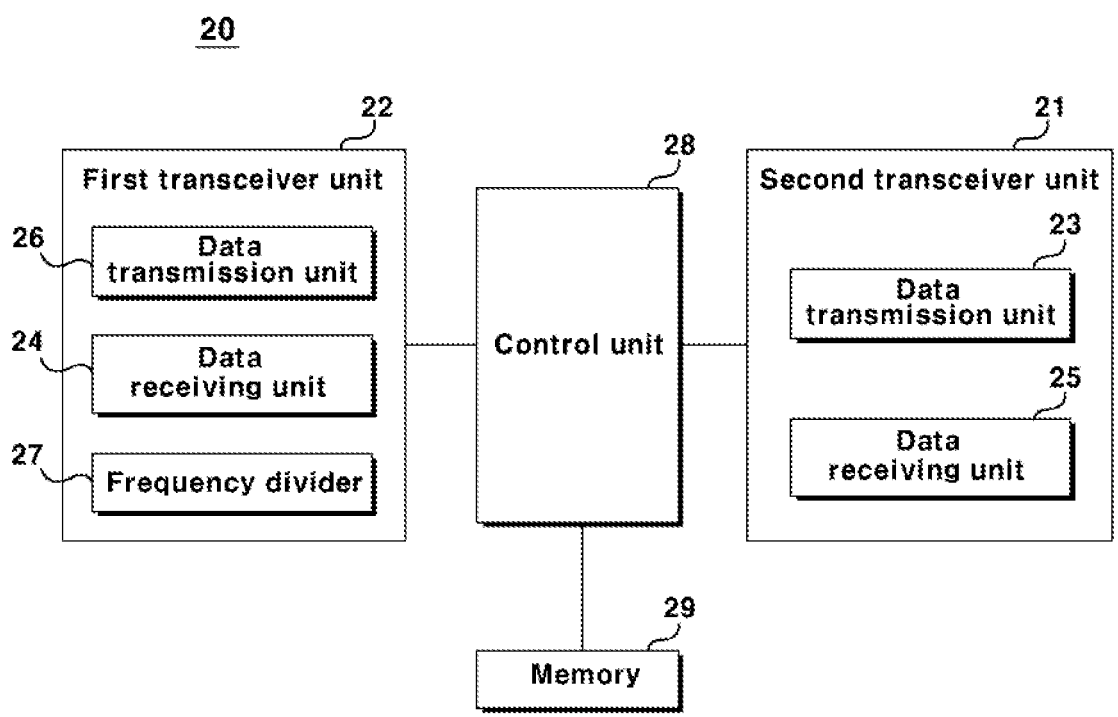

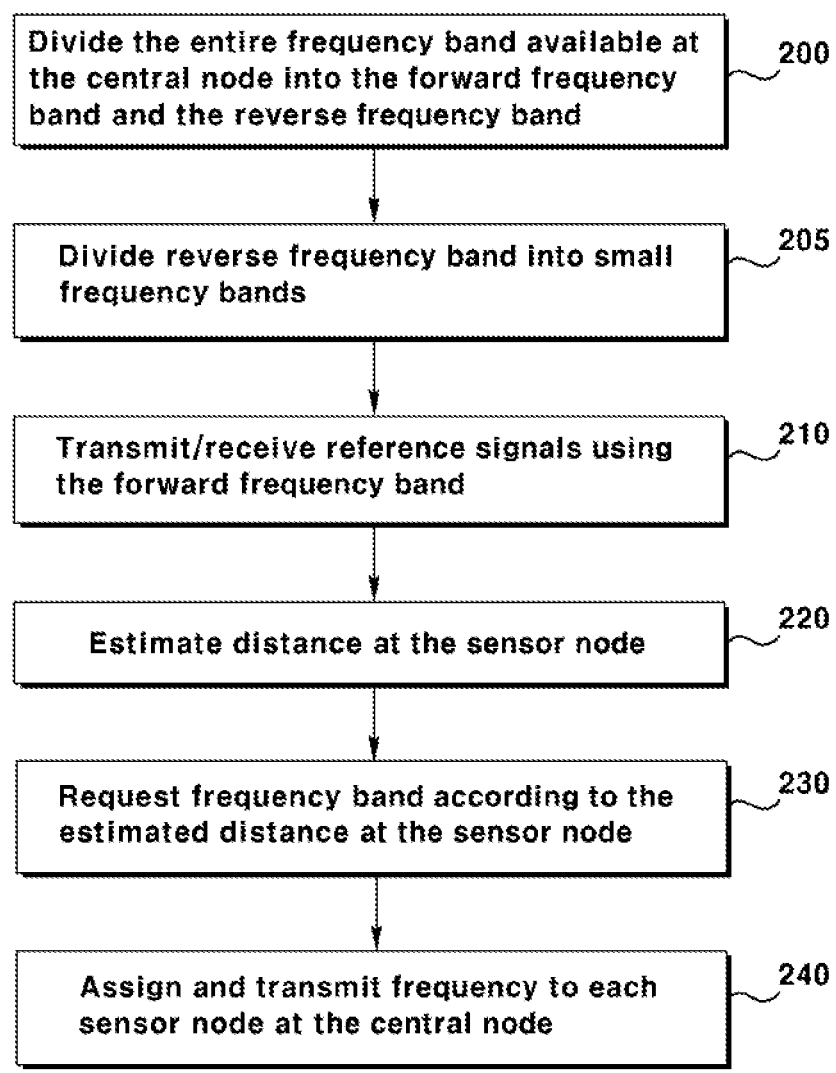
[FIG. 8]

[FIG. 9]
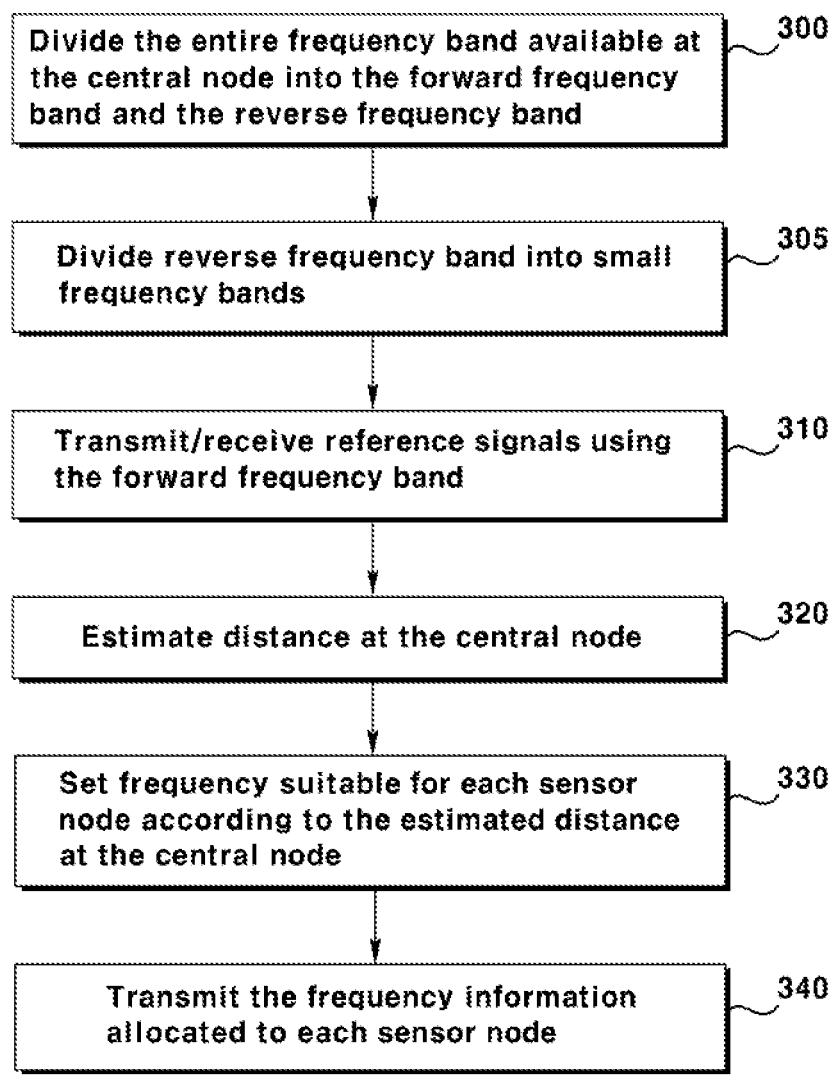

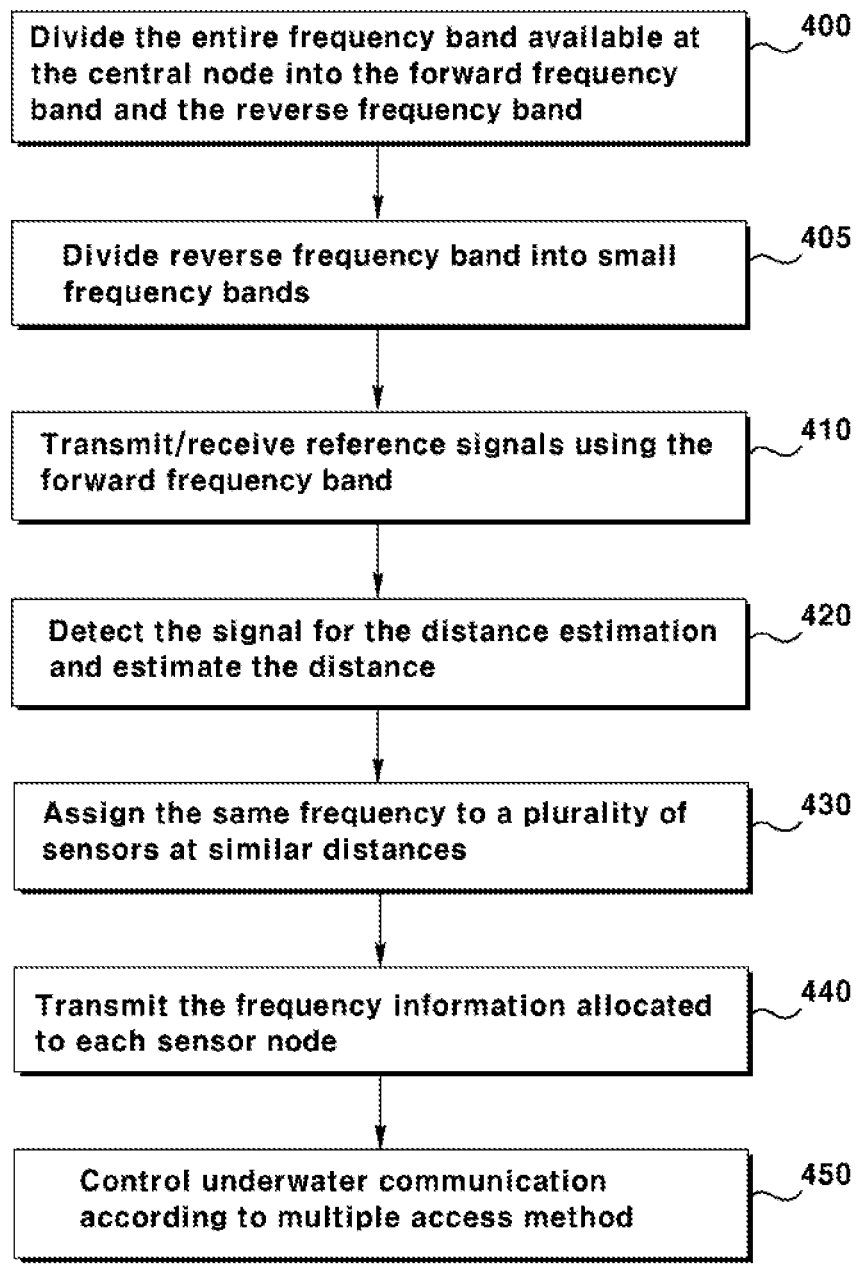

[FIG. 11]

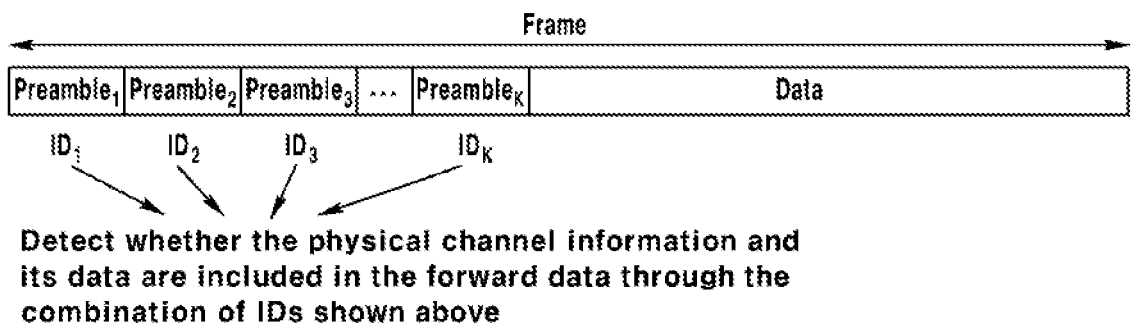

Detect whether the physical channel information and its data are included in the forward data through the combination of IDs shown above

[FIG. 12]

| $ID_C$ | Physical channel information |
|---|---|
| 0 | Broadcasting channel |
| 1 | Control channel |
| 2 | Data channel |

| $ID_G$ | Receiving node group |
|---|---|
| 0 | All the receiving node groups |
| 1~4 | Four different receiving nodes |

| $ID_M$ | Receiving node |
|---|---|
| 0 | All the receiving nodes in the corresponding receiving groups |
| 1~9 | Nine different receiving nodes |

[FIG. 13]
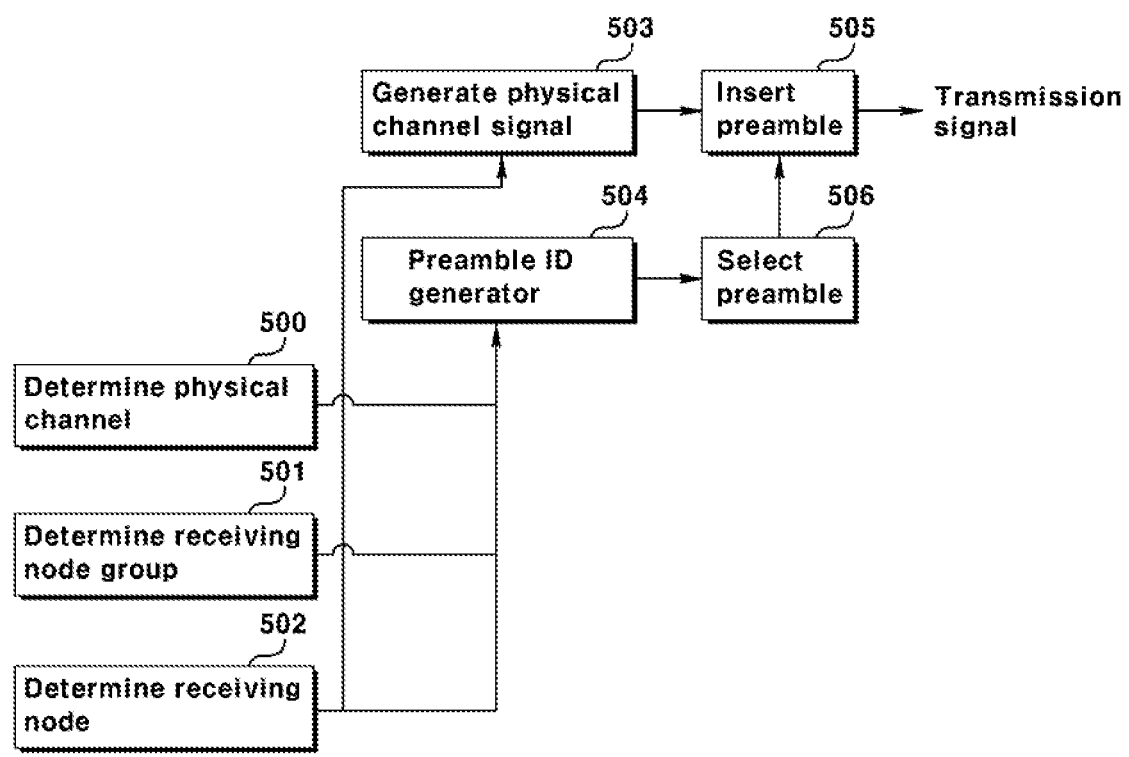

[FIG. 14]
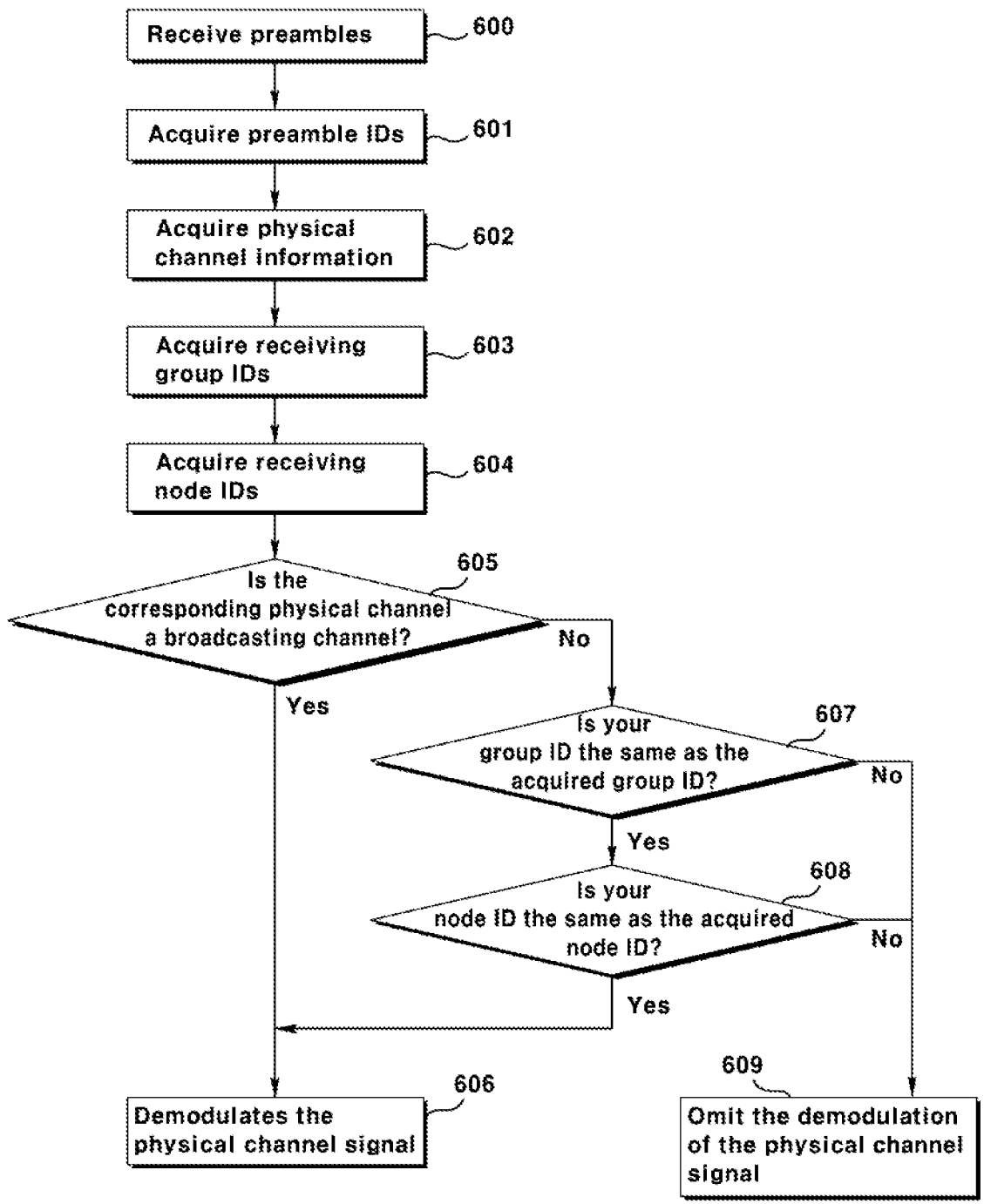

METHOD AND APPARATUS FOR SENDING SIGNAL OF UNDERWATER COMMUNICATION

CROSS REFERENCE TO RELATED APPLICATIONS

This application is the National Phase of PCT International Application No. PCT/KR2018/000583, filed on Jan. 12, 2018, which claims priority under 35 U.S.C. 119(a) to Patent Application No. 10-2017-0024012, filed in the Republic of Korea on Feb. 23, 2017, all of which are hereby expressly incorporated by reference into the present application.

TECHNICAL FIELD

The present invention relates to underwater communications, and more particularly, to an apparatus for transmitting and receiving signal incorporating physical channel information in underwater communication system, and a method thereof.

BACKGROUND OF INVENTION

Recently, the interest and importance in marine resource exploration, marine environmental monitoring, and underwater military defense have grown rapidly. Accordingly, demand on underwater communications capable of collecting various types of underwater information has also increased. The underwater communications is performed based on acoustic waves due to the nature of medium. In the underwater communication networks, the sensor nodes capable of underwater communications are deployed. The underwater communication network, then, collects data from the sensor nodes.

Due to the nature of acoustic waves, signal in underwater communication systems has relatively small bandwidths, and experiences huge attenuation compared to that in terrestrial communication systems. Consequently, frequency range used by the underwater communication systems is limited to achieve reliable communication performance over several kilometers to tens of kilometers, If demands for acquisition of underwater information increases, the number of sensor nodes should also increase. Because of limited usage of frequencies in the conventional underwater communications, however, it is difficult to control large number of sensor nodes efficiently.

In the conventional underwater communication systems based on single frequency band, if a sensor node is allocated to the frequency band, then, the remaining sensor node are unable to perform communications.

In the conventional underwater communication systems based on multiple frequency bands, if the number of sensor node that intend to perform communications is larger than that of frequency bands, then, the excess number of sensor nodes are unable to perform communications. In such systems, all sensor nodes need to monitor the usage of all frequency bands repetitively. This consumes large amount of power, which leads to decrease in operation time of underwater sensor nodes.

Therefore, the conventional underwater communication networks need to limit the number of underwater sensor nodes because of difficulty of efficient management of large number of nodes. Since demands for acquisition of underwater information in increasing rapidly, large number of sensor nodes is required inevitably. Furthermore, methods of efficient management of large number of sensor nodes are indispensable.

It is well known that replacement of batteries installed in underwater sensor nodes is very difficult. Subsequently, control for low-powered operation of large number of sensor nodes becomes essential especially in the underwater communication systems.

DETAILED DESCRIPTION OF INVENTION

Technical Problems

It is therefore an object of the present invention to provide a signal transmission apparatus for underwater communication and a method thereof, in which physical channel information is efficiently formed in a centralized underwater communication network to thereby enable a low-power operation control to be realized at a reception node side.

Technical Solution

In one general aspect of the present invention, there is provided a method for sending signal of underwater communication, in a centralized network underwater communication using a central node collecting detection information from a plurality of reception nodes for detecting underwater information and transmitting the same to a ground network, the method comprising:

setting, by the central node, a lowest frequency band in an entire useable frequency band as a frequency band for forward communication;

forming to include physical channel information and reception node information for demodulating the physical channel information in a preamble of a frame data for transmission; and transmitting, by the central node, a signal using the said set frequency band.

Preferably but not necessarily, the method may further comprise:

determining, by the plurality of reception nodes, whether the physical channel information of the preamble is its own data by receiving a signal and combining preamble values included in the frame data; and conducting, only by the reception node including its own data, the data demodulating operation as a result of the determination.

Preferably but not necessarily, the forming step may include a step of forming by combining a plurality of a plurality of physical channel information, a plurality of reception node group information and a plurality of reception node information.

Preferably but not necessarily, the forming step may include a step of forming by combining a plurality of a plurality of physical channel information and a plurality of reception node group information.

Preferably but not necessarily, the transmitting step may include a step of applying a method of carrying away data on a plurality of carrier waves.

In another general aspect of the present invention, there is provided an apparatus for sending signal for underwater communication, in a centralized network underwater communication using a central node collecting detection information from a plurality of reception nodes for detecting underwater information and transmitting the same to a ground network, the apparatus comprising:

a frequency setting module allowing the central node to set a lowest frequency band in an entire useable frequency band as a frequency band for forward communication;

a forming module allowing to form by including physical channel information and reception node information for demodulating the physical channel information in a preamble of a frame data for transmission; and a transmission module allowing the central node to transmit a signal using the said set frequency band.

Preferably but not necessarily, the apparatus may further comprise:

a reception node allowing a plurality of reception notes to determine whether the physical channel information of the preamble is its own data by receiving a signal and combining preamble values included in the frame data; and a demodulation module allowing only the reception node to conduct the data demodulating operation including its own data as a result of the determination.

Preferably but not necessarily, the forming module may further comprise:

a unit for determining an arbitrary physical channel from a plurality of physical channels;

a unit for determining an arbitrary reception node group from a plurality of reception node groups;

a unit for determining an arbitrary reception node from in a plurality of reception nodes;

a preamble generator for generating a preamble value by combining the physical channel, the reception node group, and the reception node; and a preamble insertion unit for inserting the preamble into a physical channel signal.

Advantageous Effects of Invention

A signal transmission apparatus for underwater communication and a method thereof according to the present invention can ascertain whether a reception signal is a signal provided to itself from a reception node through combination of preambles when a forward communication is performed in a centralized underwater communication network. Hence, according to the present invention, only the relevant reception node requiring data reception is controlled to perform the demodulating operation without the need of allowing all reception nodes to always perform the demodulating operation during the forward communication process.

Through the said processes, many reception nodes come to be free from performing the unnecessary demodulating operation in the forward communication process to thereby obtain an effect of preventing unnecessary power consumption.

BRIEF DESCRIPTION OF DRAWINGS

FIG. 1 is a schematic view illustrating a general underwater communication network used for underwater communication solely illustrated to help understand the present invention.

FIG. 2 is a schematic conceptual view explaining a centrally controlled underwater communication network implemented to explain conceptually an underwater communication method according to an exemplary embodiment of the present invention.

FIG. 3 is a schematic view illustrating a process of dividing a frequency band for underwater communication within a limited frequency bandwidth according to an exemplary embodiment of the present invention.

FIG. 4 is a schematic view illustrating a process of allocating a same frequency band to a plurality of sensor nodes in response to a communication distance within a limited frequency bandwidth according to an exemplary embodiment of the present invention.

FIG. 5 is a conceptual view explaining an overall underwater communication method according to an exemplary embodiment of the present invention.

FIG. 6 is a conceptual view illustrating a schematic configuration of a sensor node in order to explain an underwater communication method according to an exemplary embodiment of the present invention.

FIG. 7 is a conceptual view illustrating a schematic configuration of a central node in order to explain an underwater communication method according to an exemplary embodiment of the present invention.

FIG. 8 is a flowchart illustrating an operational flow of an underwater communication method according to an exemplary embodiment of the present invention.

FIG. 9 is a flowchart illustrating an operational flow of an underwater communication method according to an exemplary embodiment of the present invention.

FIG. 10 is a flowchart illustrating an operational flow of an underwater communication method according to an exemplary embodiment of the present invention.

FIG. 11 is a structural view of a frame data formed with transmission signals in underwater communication according to an exemplary embodiment of the present invention.

FIG. 12 is a structural view of a preamble data according to an exemplary embodiment of the present invention.

FIG. 13 is a schematic view showing partial elements of a transmission side in underwater communication according to an exemplary embodiment of the present invention.

FIG. 14 is a block diagram illustrating an operation of a reception side in underwater communication according to an exemplary embodiment of the present invention.

DETAILED DESCRIPTION OF THE PREFERRED EMBODIMENTS

Hereinafter, exemplary embodiments of the present invention will be described in detail with reference to the accompanying drawings, wherein like reference numerals are used to designate identical or similar elements, and redundant description thereof will be omitted. The suffix "part" and "node", "axis" and "dimension", "module" and "part", "unit" and "part" for the components used in the following description are to be provided or mixed solely in consideration of ease in preparing the specification, and does not per se have a meaning or a role mutually distinguishable of one from the other.

In addition, in the following description of the embodiments of the present invention, a detailed description of related arts will be omitted when it is determined that the gist of the embodiments disclosed herein may be blurred. Also, it is to be understood that the accompanying drawings are merely to provide a further understanding of the embodiments disclosed in this specification, and the technical spirits disclosed in this specification shall not be limited by the accompanying drawings, and that all changes, equivalents, and alternatives falling within the spirit and technical scope of the present invention are included.

It is to be understood that terms including ordinals, such as first, second, etc., may be used to describe various elements, but the elements are not limited to these terms. The terms are used only for the purpose of distinguishing one element from the other.

It is also to be understood that, when an element is referred to as being "connected" or "coupled" to another element, it may be directly connected or coupled to the other element, and on the other hand, when an element is referred to as being "directly connected" or "directly coupled" to another element, it should be understood that there are no other elements in between.

A singular expression includes plural expressions unless the context clearly dictates otherwise.

In the present application, the terms "comprises", "having", and the like are intended to specify the presence of stated features, numbers, steps, operations, elements, components, or combinations thereof, but do not preclude the presence or addition of one or more other features, numbers, steps, operations, elements, components, or combinations thereof.

Furthermore, the phrase of "in the water" may be interchangeably used with a word of "underwater".

Hereinafter, exemplary embodiments of the present invention will be described in detail with reference to the drawings. It will be apparent to those skilled in the art that the present invention may be embodied in other specific forms without departing from the spirit or essential characteristics thereof.

FIG. 1 is a schematic view illustrating a general underwater communication network used for underwater communication solely illustrated to help understand the present invention.

As shown in FIG. 1, the underwater communication network may include a plurality of sensor nodes (1), a sink node (5), and an intermediate node (3) serving as an information transferring function between the sensor node (1) and the sink node (5).

The transmission of underwater information in the underwater communication network constructed as described above may be performed as follows:

The underwater information detected from a plurality of sensor nodes (1) may be transmitted to the sink node (5) through the intermediate node (3) comprised of a transmission-desired sensor node (1) in several stages.

However, the said underwater communication network suffers from disadvantages in that the transmission of underwater information detected from the sensor node (1) to the sink node (5) requires that several stages of intermediate nodes (3) must be passed. As a result, a complicated routing algorithm for transmitting the detected underwater information is required in order to transmit the detected underwater information in the underwater communication network connected from the sensor node (1) and the several-staged intermediate node (3) to the sink node (5).

In addition, when a transmission error occurs in the process of transmitting the underwater information from the sensor node (1) to the sink node (5), the above-mentioned underwater communication network may come to be inconvenient in re-transmission of the detected underwater information.

Furthermore, when the problem occurs in the intermediate node for transmitting the underwater information due to the fact that the underwater communication network must pass through the intermediate nodes (3) at various stages, the underwater communication network undergoes a drawback in that the sensor node involved with the problem-generated intermediate node cannot be used.

Because of the said problems, the general underwater communication network shown in FIG. 1 is inevitably deteriorated in use efficiency of equipment, including data transmission efficiency in the process of acquiring and transmitting various types of underwater information. Thus, the present invention is provided to implement a centrally-controlled (centralized control type) underwater communication network by improving the foregoing drawbacks.

In the following description of the present invention, "frequency band" and "frequency" may be interchangeably used in some cases. Since the "frequency" refers to a frequency included in the "frequency band", and the frequency substantially carries the same signal in frequencies in a certain range of the frequency, the two expressions of "frequency band" and "frequency" may be used as having the same meaning.

FIG. 2 is a schematic conceptual view explaining a centrally controlled underwater communication network implemented to explain conceptually an underwater communication method according to an exemplary embodiment of the present invention.

The centralized control type underwater communication network according to an exemplary embodiment of the present invention may be configured by connecting sensor nodes in a centralized manner in an underwater environment.

The centralized control type underwater communication network may include at least one or more sensor nodes (10). The sensor node (10) may be installed in a fixed or movable manner in an underwater environment. The sensor node (10) may be installed as many number as possible in order to acquire lots of underwater information.

The centralized control type underwater communication network may include a central node (20) for collecting underwater information acquired from the plurality of sensor nodes (10). The central node (20) may function to transmit the underwater information collected by the plurality of sensor nodes (10) to a ground network (not shown).

The centralized control type underwater communication network configured as described above may be generally controlled as under: FIG. 3 is a schematic view illustrating a process of dividing a frequency band for underwater communication within a limited frequency bandwidth according to an exemplary embodiment of the present invention.

Referring to FIG. 3, the underwater communication conducted between the central node (20) and the plurality of sensor nodes (10) may be basically performed by ultrasonic waves. Furthermore, an entire frequency band useable by the central node (20) may be divided into a forward frequency band and a reverse frequency band. Here, the entire frequency band useable by the central node (20) means a frequency band included for underwater communication-enabled region between the central node (20) and the sensor node (10) installed at mutually different distances. That is, the entire frequency band useable by the central node (20) means a frequency band where a signal can be transmitted from a central node (20) to a sensor node (10) installed at an arbitrary position, and a signal transmitted from the censor node (10) can be received for use at the central node (20).

The forward frequency band may be used when a signal is transmitted from a central node (20) to a plurality of sensor nodes (10). The frequency band used at this time is set to be a lowest frequency band (f)) among the frequency bands useable by the central node (20).

Generally, the communication range increases as a frequency to be transmitted and received becomes lower in the underwater communication environment. Therefore, when a signal is transmitted from the central node (20) to the sensor node (10), the signal reception must be available for all sensor nodes regardless of distances. As a result, the frequency band (f0) having the lowest frequency may be determined to be a forward frequency band, which is then used for signal transmission from the central node (20) to the plurality of sensor nodes (10).

Moreover, a reverse frequency band may be used for performance of signal transmission from each of the plurality of sensor nodes (10) to the central node (20). Here, all the remaining frequency bands except for the forward frequency band may be included in the reverse frequency band in all the useable frequency bands.

The reverse frequency band may be further divided into a plurality of small frequency bands. At this time, the division into small frequency bands may be performed in such manner that sensor nodes capable of transmitting and receiving signals in the same frequency band between a distance from the sensor node based on the central node may be grouped by a same region, and the grouped region may be divided into the number of small frequency bands (M numbers, described later) as many as the number of the divided regions.

Furthermore, the respectively divided small frequency bands may be so allocated as to be used for signal transmission of the sensor node (10) respectively installed at different positions. For example, the frequency band (f1) may be allocated to a sensor node (10) located at the farthest distance from the central node (20). In addition, a frequency band (fM) may be allocated to a sensor node (10) located nearest to the central node (20).

In this case, a sensor node (10) located at the farthest distance from the center node (20) may be allocated to the lowest frequency band in the frequency bands included in the reverse frequency band based on the central node (20). Conversely, the highest frequency band in the frequency bands included in the reverse frequency band may be allocated to a sensor node (10) located closest to the center node (20). As briefly mentioned in the foregoing discussion, the frequency (f1) in the lower frequency band may be allocated to the longest distance communication frequency, because the communication range increases as the frequency to be transmitted and received becomes lower in the underwater communication environment. Moreover, the frequency (IM) in the highest frequency band may be allocated to the shortest communication frequency.

Frequency bands for underwater communication may be allocated to the respective sensor nodes (10) through these processes, and thereafter, the underwater communication may be performed where the underwater information detected by the sensor node (10) is transmitted to the central node (20) using the frequency band allocated with the underwater information detected by the sensor node (10).

Next, FIG. 4 is a schematic view illustrating a process of allocating a same frequency band to a plurality of sensor nodes in response to a communication distance within a limited frequency bandwidth according to an exemplary embodiment of the present invention.

Underwater communications may be more affected by environmental factors compared to ground communications. Therefore, in the process of detecting underwater information using the underwater sensor in the sensor node (10), the loss of the sensor nodes (10) due to environmental influences cannot be avoided. Furthermore, even if an arbitrary sensor node (10) normally detects underwater information, the data transmission success rate cannot always be satisfied by 100% in the course of the detected underwater information being transmitted to the central node (20). Hence, as long as the condition of the underwater communication network is permitted, installation of as many sensor nodes (10) as possible may enable to obtain more accurate and more diversified underwater information.

Meanwhile, as shown in FIG. 4, there may be available a region capable of transmitting a signal using the same frequency band between the central node (20) and the sensor node (10). That is, the sensor nodes existing on a region 1 included in the nearest distance based on the central node (20) may be equally allocated with the divided frequency band (Fm). Moreover, the sensor nodes existing on a region (M) included in the farthest distance based on the central node (20) may be equally allocated with the divided frequency band (f1).

The regional division to a same region or to different region between the central node (20) and the sensor node (10) may be realized within a signal transceivable range between the central node (20) and the sensor node (10). That is, sensor nodes capable of conducting the underwater communication using the same frequency band (fM) may be included in the region 1. In addition, sensor nodes capable of conducting the underwater communication using the same frequency band (f1) may be included in the region M.

The reason the same frequency band is allocated to a plurality of sensor nodes is that the frequency band useable in the central node (20) is limited. For example, in order to acquire underwater information more accurately and more diversely, there is no way but to increase the number of sensor nodes. In this case, there may be generated an instance where the number of sensor nodes (10) installed in the entire frequency band useable by the central node (20) are greater than that of divided reverse frequency bands. At this time, as illustrated in FIG. 4, sensor nodes existing in the same region may be controlled in underwater communication by being allocated with the same frequency band.

When the same frequency band is allocated to a plurality of sensor nodes as described above, a plurality of sensor nodes (10) in the same region allocated with the same frequency band can perform the communication with the central node 20 under the control of central node (20) using various multiple access schemes (frequency division multiple access scheme, a time division multiple access scheme, a code division multiple access scheme, a carrier sensing multiple access scheme, and the like). A detailed description of the known multiple access scheme will be omitted hereinafter.

Next, a process of detecting distance information from a central node to a sensor node may be required in order to enable an adaptive communication in response to the distance between the central node and the sensor node in the underwater communication network according to the exemplary embodiment of the present invention. Prior to advancing to the explanation of said process, a schematic configuration for transmission and reception of underwater information between the central node and the sensor node according to the present invention will be described.

FIG. 5 is a conceptual view explaining an overall underwater communication method according to an exemplary embodiment of the present invention, FIG. 6 is a conceptual view illustrating a schematic configuration of a sensor node in order to explain an underwater communication method according to an exemplary embodiment of the present invention, and FIG. 7 is a conceptual view illustrating a schematic configuration of a central node in order to explain an underwater communication method according to an exemplary embodiment of the present invention.

Referring to FIG. 5, a plurality of sensor nodes (10) collects underwater information and transmits the collected information to a central node (20).

At this time, underwater information is transmitted and received between the plurality of sensor nodes (10) and the central node (20) using the ultrasonic wave, which enables signal transmission in an underwater communication network (50) in light of characteristics of the medium.

At this time, a position data (information) of sensor node (10) may be also transmitted when signals are transmitted from the sensor nodes (10) to the central node (20). The position information of the sensor node (10) is preferably recorded and stored in the sensor node (10) at a time when the sensor node (10) is installed at an arbitrary position in the water. However, it is difficult for the sensor node (10) to be fixedly installed due to the characteristics of the underwater environment. Therefore, although the position data is described as the position information in the above-mentioned explanation, it is preferable that the position information be simply understood as sensor node (10) identification information.

The central node (20) may transmit the underwater information collected from the plurality of sensor nodes (10) to the ground. The central node (20) may transmit the underwater information acquired by a management node (64) of a terrestrial communication network (60). Accordingly, the central node (20) may perform underwater communication with a plurality of sensor nodes (10) in the underwater communication network (50) and may perform communication with the management node (64) on the ground. The management node (64) may conduct a function of connecting the underwater information transmitted through the central node (20) to the ground communication network (62) using a radio signal.

Referring now to FIG. 6, the sensor node (10) may include one or more sensor units (30) for collecting necessary data from underwater, a data transmission unit (36) for modulating the data sensed by each sensor unit (30), converting the sensed data into ultrasonic waves, and transmitting the data to a central node (20), and a data receiving unit (38) for receiving and demodulating ultrasound signals transmitted from the central node (20).

The data transmission unit (36) and the data receiving unit (38) may be included in a transceiver unit (40), and a control unit (32) for performing the control between the sensor unit (30) and the transceiver unit (40) may be further included. Furthermore, the sensor node (10) may be configured by including a memory (34) and the like for storing various data and algorithms required for the overall operational control of the sensor node (10) and for storing the underwater information detected by the sensor unit (30).

The plurality of sensor units (30) may sense various kinds of underwater information including water temperature, dissolved oxygen amount, seismic wave in response to their purposes and output the sensed data to the control unit (32). The sensor unit (30) may be a digital sensor, but the sensor unit (30) may be so configured as to convert data detected in an analog signal into digital data and output the digital data. In this case, the sensor unit (30) may include an analog-to-digital converter for converting an analog signal into a digital signal. Furthermore, in all the configurations of the present invention, it should be appreciated that the signal-processed data is based on a digital signal.

The transceiver unit (40) may perform the function of transmitting or receiving data by using ultrasonic waves in the water. That is, the data transmission unit (36) may modulate the underwater information detected by the sensor unit (30), convert the detected underwater information into an ultrasonic signal, and transmit the ultrasonic signal to the central node (20). The data receiving unit (38) may receive and demodulate the ultrasound signals transmitted from the central node (20), and output the ultrasound signals to the control unit (32).

The illustrated sensor node (10) may receive the underwater information transmitted from the central node (20) via the data receiving unit (38). At this time, in order to enable reception of the signal transmitted from the central node (20), the data receiving unit (38) may set the frequency to a frequency included in the forward frequency band. Furthermore, the data transmission unit (36) may be set to a specific frequency included in the frequency band allocated to itself, and transmit information to be transmitted to the central node (20) via the previously set specific frequency. Therefore, the transceiver unit (40) may include a configuration in which the frequency is set wider a control of the control unit (32). Such a configuration is implemented by a known art, and therefore, further explanation thereto is to be omitted. The control may be implemented in such a manner that, in an initial setting process in which frequency of each sensor node (10) is not set, the frequency is set at the forward frequency band at the time of receiving the signal from the central node (20), and the frequency is set at the lowest frequency band among the divided reverse frequency bands when the signal is transmitted to the central node (20) before the initial setting.

Furthermore, although the sensor node (10) in the present invention may be fixedly installed at a specific position in an underwater environment, it should be inevitable to allow the sensor node (10) to be moved only within a certain region because of the influence of ocean currents. Since the sensor node (10) tends to be moved in this way, it is preferable that the distance measurement with the central node 20 be performed in real time when the underwater information measurement is performed. However, if the real-time control is unreasonable, it may be preferable to repeatedly measure at intervals avoiding a time when underwater communication is performed. Since a use frequency against distance may be changed, the sensor node (10) may require a real-time variable control of the useable frequency band for the underwater communication with the central node (20).

Under this circumstance, it is preferable that the transceiver unit (40) of the sensor node (10) be so configured as to enable a variable control of the set frequency. That is, a frequency for transmitting the information may be variably controlled in response to a current position of the sensor node (10) to allow the to-be-transmitted information to be transmitted to the central node (20). Furthermore, it is preferable that the movement position of the sensor node (10) be limited only to within a certain radius in which signals can be transmitted and received to and from the central node (20), whereby the risk of the sensor node (10) is prevented from being lost.

The control unit (32) may perform a control of storing various kinds of underwater information detected by the sensor unit (30) in the memory (34) or may control the transmission and reception of underwater information performed through the transceiver unit (40).

In addition, the control unit (32) may perform a control of detecting a distance between the sensor node (10) and the central node (20). Toward this end, the control unit (32) may include a configuration in which a reference signal transmitted from the central node (20) for distance detection is received by the data receiving unit (38) and magnitude of the received power is detected. The power intensity of the reception signal may be detected by a simple calculation process by directly detecting the power of the reception signal or detecting the current, voltage, and the like. The received power magnitude detection configuration is applicable to various techniques including a well-known power detector. The current magnitude can be easily detected by providing a current detecting resistor in the receiving unit. Since these detection processes utilize the known technique, the detailed description thereof will be omitted. A distance estimation using the detected power intensity of the reception signal may be implemented by using a 'distance versus power intensity value' pre-stored in the memory (34).

Moreover, as another method for distance detection, the control unit (32) may detect a delay time, which is a time taken to reach the sensor node (10), after a signal is transmitted from the central node (20). The delay time may be detected, for example, by comparing a difference between time information at which the signal transmission starts at the central node (20) and time information at which the signal arrives. In order to detect the arrival time information, it is preferable that the control unit (32) include a time counting function and the like. In the distance estimation using the detected delay time, it is possible to estimate the distance using a 'delay time verses distance value's; pre-stored in the memory (34).

The memory (34) may be used or needed by the sensor node (10) and may be used for storing various kinds of information. The detected information by the sensor unit (30) may be also stored in the memory (34). Particularly, when the distance is directly detected by the sensor node (10), the memory (34) may store various types of information to be used for distance detection. For example, the memory (34) may store information for determining the strength of the received power, information for detecting the delay time, information for determining the distance between the central node (20) and the sensor node (10) using the received power, frequency band information capable of underwater communication according to the estimated distance information, and the like. The controller (32) may perform the processes for distance estimation, a specific frequency band request, and the like, using the various types of information stored in the memory (34).

Referring to FIG. 7, the central node (20) may include a first transceiver unit (22) for transmitting and receiving underwater signals to and from the sensor node (10), and a second transceiver unit (21) for transmitting and receiving underwater signals to and from the management node (64). The central node (20) may include a control unit (28) for controlling the first and second transceiver units and for controlling information storage, and a memory (29) for storing various types of information. It is preferable that the second transceiver unit (21) be so configured as to enable to transmit ultrasonic waves based on whether the position of the central node (20) is above the water surface or below the water surface, or to transmit with a radio signal.

In addition, the central node (20) may include a frequency divider (27) for dividing the entire usable frequency band into a forward frequency band and a reverse frequency band, and further dividing the reverse frequency band into small frequency bands. The frequency divider (27) may be included in the first transceiver unit (22) because the frequency divider (27) may be used when transmitting and receiving the underwater information with the sensor node (10).

The frequency divider (27) may be so configured as to enable to divide the entire frequency band available in the central node (20) into frequency bands as small as the number of regions (M), as shown in FIG. 4. Therefore, the control unit (28) may control the frequency division of the frequency divider (27), and control the frequency divider (27) to divide the frequency of the frequency divider (27) into a relevant frequency when transmitting/receiving signals to/from an arbitrary sensor node (10) so that transmission and reception of signals can be normally performed.

A data transmission unit (26) in the first transceiver unit (22) may be set to a forward frequency band (f0) to allow signal transmission to all the sensor nodes. A data receiving unit (24) in the first transceiver unit (22) may be set to all the reverse frequencies existing within a frequency band allocated to an arbitrary sensor node which is to perform the underwater communication. However, in the initial setting process in which no frequency is set in each sensor node (20), the data receiving unit (24) is set to the lowest frequency band among the divided reverse frequencies. This is because the sensor node (10) can receive a signal transmitted from a sensor node existing at all distances before frequency setting is performed.

To this end, a frequency division may be performed through the frequency divider (27) under a control of the control unit (28), and a series of processes of setting the frequency of the data receiving unit (24) may be controlled by the divided frequency. The frequency dividing operation of the frequency divider may be preferably performed in a digital manner. In addition, the data receiving unit (24) may include a frequency variable control structure to enable normal signal reception during signal transmission/reception with all the sensor nodes.

In addition, the control unit (28) may perform the control of distance detection between the sensor node (10) and the central node (20) in accordance with power management and traffic control for each sensor node (10) and multiple accesses control and necessity relative to the sensor nodes (10) existing at a similar distance with traffic control.

In the present invention, although it is possible for the control unit (32) of the sensor node (10) to perform the distance detection process, the control unit (28) of the central node (20) may also perform the distance detection process.

Therefore, the control unit (28) may include a configuration in which the reference signal transmitted from the sensor node 10 for distance detection is received by the data receiving unit (24) at the initial setup process where the frequency of the sensor node is not set, and the size of received power is detected. The power intensity of the reception signal may be detected by directly detecting the power of the reception signal or by a simple calculation process through detection of the current, voltage, and the like. The received power magnitude detection configuration may be applicable by various techniques including a known power detector. It is also possible for the received power magnitude detection to be performed by the sensor node and to receive only the detected information. The current magnitude can be easily detected by providing a current detecting resistor in the receiving unit. Likewise, it is also possible for the current magnitude detection to be performed by the sensor node and to receive only the detected information. Since these detection processes utilize a known technique, detailed description thereof will be omitted. The distance estimation using the power intensity of the detected reception signal may allow estimating the distance using the 'distance versus power intensity value' pre-stored in the memory (29).

In addition, as another method for distance detection, the control unit (28) may detect and use a delay time which is a time taken to reach the central node (20) after a signal is transmitted by the sensor node (10). The delay time can be detected, for example, by comparing a difference between the time information at which the signal transmission starts from the sensor node (10) and the time information at which the signal arrives at the central node (20). In order to detect the arrival time information, it is preferable for the control unit (28) to include a time counting function or the like. In the distance estimation using the detected delay time, it is possible to estimate the distance using the distance value compared with the delay time pre-stored in the memory (29).

The memory (29) may be used for storing various types of information to be used, required or detected by the sensor node (10). Particularly, when the distance is detected by the central node (20), the memory (29) may store various types of information to be used for distance detection. For example, the memory (29) may store the strength of received power supplied from the sensor node (10), information for determining the distance between the central node (20) and the sensor node (10) using a delay time, frequency band information capable of allocating underwater communication in response to the estimated distance information. The control unit (28) may estimate a distance by using the various types of thus-acquired information stored in the memory (29), and select a specific frequency band to be allocated to an arbitrary sensor node. The memory (29) may also include control information for frequency division, and may further store relevant information such as divided frequency bands and sensor nodes set thereon. Moreover, the memory (29) may also store underwater information collected from the sensor nodes.

Next, FIG. 8 is a control flowchart illustrating an operational flow of an underwater communication method according to an exemplary embodiment of the present invention. FIG. 8 illustrates an operational procedure based on a first control method to be used when a specific frequency is allocated to a sensor node (10) at the central node (20).

The distance information between a central node (20) and a sensor node (10) must be detected in the underwater communication network according to the present invention. Furthermore, a specific frequency band is allocated to the sensor node (10) in response to the detected distance information. That is, it is necessary to adaptively allocate a specific frequency according to the detected distance information.

First, the control unit (28) of the central node (20) may identify the entire usable frequency band and divide the usable entire frequency band into the forward frequency band and the reverse frequency band as shown in FIG. 3 (step 200).

In addition, the control unit (28) may perform a controlling process of dividing the reverse frequency band into small frequency bands as many as the number of regions (M number) as shown in FIG. 4 (step 205). It is preferable that the steps 200 and 205 be controlled so as to be pre-set in response to performances of the central node. That is, when the central node (20) transmits and receives a signal in an underwater environment, frequencies that can be transmitted to the farthest point may be included in the forward frequency band, and these frequencies may be made to be pre-stored. When the central node (20) transmits and receives a signal in an underwater environment, the distances (regions) in which each operating frequency can transmit a signal may be pre-classified, and these distances may be pre-stored. It is preferable that the distance values and frequency values thus pre-set be preferably stored in the memory (29) of the central node (20) and the memory (34) of the sensor node (10), and thereafter used in the frequency-setting process.

Subsequently, a reference signal to be used for detecting the pre-stored distance information may be read out from the memory (29). The reference signal may be carried on the forward frequency band and converted into an ultrasonic signal through the data transmission unit (26), and transmitted to all sensor nodes (10) included in the entire usable frequency band of the central node (20), where the receiving unit (38) of the sensor node (10) may receive the reference signal (step 210).

The sensor nodes (10) having received the reference signal in the step 210 may detect the power of the reception signal and the time delay used in the signal transmission, and may estimate a distance to the central node (20) using the detected signal (step 220). The distance between the sensor node (10) and the central node (20) may be estimated by using the power intensity of the reception signal.

After the distance is estimated at the step 220, the sensor node (10) requests the central node (20) to allocate a frequency band relevant to the estimated distance to its frequency band (step 230). In the process of requesting the specific frequency band at the step 230, and in light of the fact that this process is prior to allocation of frequency band to the relevant sensor node, a frequency band request signal is transmitted using the frequency band set as the lowest frequency band in the reverse frequency bands. Furthermore, the frequency band relevant to the distance estimated at the step 230 may be pre-set based on the stored value of the memory (34), where selection may be realized.

Thereafter, the central node (20) may collect the frequency band information requested from a plurality of sensor nodes (10), allocate a frequency band suitable for each sensor node (10), and transmit the allocated frequency information to a side of the sensor node (10) (step 240). Therefore, up to the step 240, the data receiving unit (24) of the central node (20) may be also set as the forward frequency band.

Thereafter, the sensor node (10) may receive, from the central node (20), an ultrasonic signal transmitted in the frequency band (f0) allocated to the forward frequency band at the time of transmitting/receiving underwater information with the central node (20), and may transmit an ultrasound signal to the central node (20) with the underwater information carried in the frequency band allocated to itself within the reverse frequency band.

Through this process, an appropriate frequency band may be adaptively allocated between the central node (20) and the plurality of sensor nodes (10) in response to the distance information between the central node (20) and the sensor node (10). Therefore, unusable sensor nodes may not be generated by the unreasonable allocation frequency, because the appropriate frequency is allocated to each of the plurality of sensor nodes (10) within a limited frequency band according to the respective distances. That is, the underwater communication between the plurality of sensor nodes (10) and the central node (20) can be efficiently performed.

Nest, FIG. 9 is a flowchart illustrating an operational flow of an underwater communication method according to an exemplary embodiment of the present invention.

FIG. 9 shows an operational procedure according to a second control method used when a specific frequency is allocated to the sensor node (10) at the central node (20). The illustrated exemplary embodiment is a control process for estimating a distance to each sensor node (10) under its own judgment at the central node (20) and allocating the frequency to each sensor node (10) according to the estimated distance.

First, the control unit (28) of the central node (20) may identify an entire usable frequency band and divide the usable entire frequency band into the forward frequency band and the reverse frequency band, as shown in FIG. 3 (step 300).

Furthermore, the control unit (28) may perform the controlling operation of dividing the reverse frequency band into small frequency bands as many as the number of regions (M number), as shown in FIG. 4 (step 305). It is preferable that the steps 300 and 305 be so controlled as to allow being pre-set in response to performances of the central node (20). That is, when the central node (20) transmits and receives a signal in an underwater environment, frequencies that can be transmitted to the farthest point may be included in the forward frequency band, and these frequencies are pre-stored. When the central node (20) transmits and receives a signal in an underwater environment, the distances (regions) in which each operating frequency can transmit a signal may be pre-classified, and pre-stored. It is preferable that the distances and frequency values thus set be stored in the memory (29) of the central node (20) and the memory (34) of the sensor node (10) and thereafter used in the frequency-setting process.

Then, a reference signal to be used for detecting the distance information pre-stored may be read out from the memory. The reference signal may be carried on the forward frequency band, and converted into an ultrasonic signal, whereby the transmission operation from all the sensor nodes (10) to the central node (20) can be controlled. The central node (20) having received the reference signal transmitted from the plurality of sensor nodes (10) through the data receiving unit (24) may detect the power intensity of the reception signal from each sensor node, the delay time used for the transmission time. The signal transmission/reception process for detecting the above-described detection signal is a state before the frequency band is allocated to the relevant sensor node. Thus, the data transmission unit (36) of the sensor node (10) and the data receiving unit (24) of the central node (20) may transmit and receive signals using the frequency band set to the lowest frequency band in the reverse frequency bands (step 310). On the other hand, it is also possible for the sensor node (10) to directly perform the signal detection operation for later use in the distance estimation by inputting the detection control information to the central node (20).

The central node 20 having detected a signal for distance estimation at step 310 may estimate a distance between the central node and each sensor node using the power intensity of the reception signal from the each sensor node and time delay used in signal transmission (step 320). At this time, the distance can be estimated by using a 'distance versus power intensity value' pre-stored in the memory (29). It is also possible to estimate the distance by using a 'time delay versus distance value' pre-stored in the memory (29).

Subsequently, the central node (20) may adaptively allocate a frequency band suitable for each sensor node (10) in response to the estimated distance, and transmit the allocated frequency information to the side of relevant sensor node (steps 330, 340).

Thereafter, during reception and transmission of the underwater information with the central node (20), the sensor node (10) may receive from the central node (20) an ultrasonic signal carried in the frequency band (f0) allocated to the forward frequency band, and transmit, to the central node (20), the ultrasonic signal with the underwater information carried in the frequency band allocated to itself within the reverse frequency band.

Through this process, an appropriate frequency band may be adaptively allocated between the central node (20) and a plurality of sensor nodes (10) in response to the distance information between the central node (20) and the sensor node (10), whereby the underwater information communication can be implemented. Therefore, the present invention enables efficient communication of the plurality of sensor nodes (10) and the central node (20) in the water within a limited frequency band.

Next, FIG. 10 is a flowchart illustrating an operational flow of an underwater communication method according to an exemplary embodiment of the present invention.

The illustrated FIG. 10 shows an operational procedure according to a third control method used when a specific frequency is allocated to the sensor node (10) from the central node (20). In the illustrated exemplary embodiment, a process diagram is used to show that the same frequency band can be set on a plurality of sensor nodes.

The control unit (28) of the central node (20) may identify an entire usable frequency band and divide the usable entire frequency band into the forward frequency band and the reverse frequency band, as shown in FIG. 3 (step 400).

Moreover, the control unit (28) may perform the controlling operation of dividing the reverse frequency band into small frequency bands as many as the number of regions (M number), as shown in FIG. 4 (step 405). It is preferable that the steps 400 and 405 be so controlled as to allow being pre-set according to the performance of the central node. That is, when the central node (20) performs transmission and reception of signals in the underwater environment, the center node (20) may pre-store frequencies transmittable to the farthest point in the forward frequency band. When the central node (20) transmits and receives a signal in an underwater environment, the distance (region) transmittable of signal by each use frequency may be pre-classified and pre-stored. It is preferable that thus-set distances and frequency values may be stored in the memory (29) of the central node (20) and in the memory (34) of the sensor node (10), and then used for the frequency-setting process.

Then, the reference signal to be used for detecting the pre-stored distance information may be read out from the memory (29). The reference signal may be carried on with the forward frequency band, converted into an ultrasonic signal through the data transmission unit (26), and transmitted to all the sensor nodes (10) contained in the entire usable frequency band of the central node (20) (step 410).

The sensor nodes (10) having received the reference signal transmitted at step 410 through the data receiving unit (38) may detect the power intensity of the reception signal and/or the time delay used in signal transmission, where the detected signal may be transmitted to the central node (20). In the detection signal transmission process, the detected signal may be transmitted to the central node (20) using the lowest frequency band in the reverse frequency bands, since the frequency band is not allocated to the relevant sensor node in this case.

The control unit (28) of the central node (20) which has received the detected signals may estimate a distance between the central node and each sensor node by using the power of the reception signal inputted from each sensor node and/or the time delay used in signal transmission (step 420). In this case, the distance can be estimated by using the 'distance versus power intensity value' pre-stored in the memory (29). It may be also possible to estimate the distance using the 'time delay versus distance value' pre-stored in the memory (29).

Thereafter, the central node (20) may adaptively allocate a frequency band suitable for each sensor node (10) in response to the estimated distance (step 430). When a frequency is allocated to the sensor node (10) at step 430, as shown in FIG. 4, the same frequency band may be allocated to the sensor nodes at the same or similar distance. At this time, the central node (20) may bind sensor nodes capable of transmitting and receiving signals in the same frequency band based on the central node (20). In addition, the same frequency band may be allocated to the same region.

Furthermore, the frequency band information allocated at the step 430 based on each region may be transmitted to a plurality of sensor nodes (step 440).

Thereafter, while receiving and transmitting underwater information with the central node (20), the sensor node (10) may receive, from the central node (20), an ultrasonic signal carried with the frequency band (f0) allocated to the forward frequency band, and transmit, to the central node (20), an ultrasonic signal with the underwater information carried in the frequency band allocated to itself within the reverse frequency band.

Meanwhile, sensor nodes existing within the said same region may implement the underwater transmission with the same frequency band. Therefore, in this case, it is necessary for the control unit (28) in the central node (20) to appropriately control the underwater communication with a plurality of sensor nodes existing in the same area. In this case, as explained before, the underwater communication control in response to the multiple access method may be implemented (step 450).

The reason the same frequency is allocated to a plurality of sensor nodes is because there is a limit in the frequency band useable by the central node (20). For example, in order to acquire underwater information more accurately and diversely, there is no way but to increase the number of sensor nodes. Under this circumstance, there may be generated cases where the number of sensor nodes (10) available at the central node (20) installed within the entire frequency band are greater than the number of divided reverse frequency bands. At this time, as shown in FIG. 4, the same frequency band may be allocated to the sensor nodes existing in the same region whereby the underwater communication can be controlled.

According to the exemplary embodiment of FIG. 10, the underwater communication of the present invention can be controlled in such a manner that the same frequency band is allocated to a plurality of sensor nodes (10) within the limited frequency band, and a plurality of sensor nodes is efficiently controlled by the control of the multiple access method of the central node (20). Therefore, the underwater communication control can be efficiently implemented even for the greater number of sensor nodes than that of divided frequency bands.

Meanwhile, the forward frequency band described in the foregoing explanation has been exemplified when used during a signal being transmitted from the central node (20) to the plurality of sensor nodes 10. Moreover, the foregoing explanation has also described that the frequency band used at that time had been set at the lowest frequency band (f0) in the frequency bands useable by the central node 20.

Furthermore, the description has been made that the reverse frequency band had been used when performing the signal transmission from each of the plurality of sensor nodes (10) to the central node (20). At this time, the description has been made that all the available frequency bands except for the forward frequency band are included in the reverse frequency band. The description has been also made that the reverse frequency band had been divided into a plurality of small frequency bands, and used by being allocated to each sensor node.

The said configuration has been given as an example in which the central node and the plurality of sensor nodes constitute a centralized underwater communication network system. Accordingly, the central node may be expressed as an underwater base station, the plurality of sensor nodes may be expressed as a plurality of reception nodes, and the explanation may be also given as a plurality of reception nodes being provided around the underwater base station to implement a centralized underwater communication network system.

Meanwhile, the to-be-used forward frequency band is set at a band capable of receiving signals from all plural sensor nodes under the management of the central node, when transmitting signals from the central node to a plurality of sensor nodes.

Therefore, all the plural sensor nodes under the management of the central node are placed under a state of being receivable of signals transmitted from the central node, when the central node transmits a signal. In other words, all the plural sensor nodes receive signals.

When all the plurality of sensor nodes receives signals as noted above, all the plural sensor nodes implements a process of checking whether the reception signal is its own signal by demodulating the reception signal. That is, all the plural sensor nodes perform an operation of demodulating the reception signal. Although there are cases where the central node sends signals to all plural sensor nodes, the underwater communication, however, in most cases, is performed by way of a centralized network method between a certain sensor node and a central node through a process of transmitting signals to only some sensor nodes. Therefore, even despite the fact that it suffices for only a portion of sensor nodes requiring signal reception to perform the demodulation operation, all the sensor nodes are made to perform the demodulation operation to thereby result in generation of power consumption caused by unnecessary operation. Hence, in order to solve the said problems, the present invention constitutes a frame signal where the demodulation operation of the reception signal is limited to a minimum for other sensor nodes than some sensor nodes which must receive a signal, when forward communication is performed between a central node and a plurality of sensor nodes.

Hereinafter, as described above, an operation will be described where a centralized underwater communication network is implemented between one central node and a plurality of sensor nodes within a limited frequency band, and a low-power control is realized when performing a forward underwater communication.

A frequency (or a frequency band or a small frequency band) to be used between the central node (20) and an arbitrary sensor node (10) has been allocated in the previous process. Thereafter, the aforementioned allocated frequency is to be used in transmitting a signal between the central node (20) and the arbitrary sensor node (10). Furthermore, the forward frequency band is to be used when transmitting signals from the central node (20) to the sensor node (10).

In the centralized underwater communication network in which frequency bands are allocated and used, preamble data are used for synchronization, and all nodes perform a process of detecting a preamble of forward link for synchronization between physical layers.

The underwater communication according to the present invention may use the OFDM, FBMC, and FMT methods are used in which data is transmitted via a plurality of carriers.

In the following description, a process of performing underwater communication will be explained by applying the OFDM communication method as one example of the centralized underwater communication of the present invention.

FIG. 11 illustrates one frame data used in the OFDM communication method. In other words, encoded data may be mapped by a plurality of OFDM (Orthogonal Frequency Division Multiplexing) symbols in order to generate one frame data, as illustrated in FIG. 11, and the above frame data may be modulated by using the OFDM method to constitute a transmission signal, and transmitted via mutually separated N number of subcarrier waves.

The frame data of the physical layer may include a preamble sharable by all nodes in the cell, because information between the central node and the reception node cannot be mutually known. That is, the frame data used for the OFDM communication may include preamble data at a front end of all transmission data. The purpose of the preamble transmitted by the preamble data is to indicate the transmission type and the basic transmission parameter of the frame. Therefore, the preamble may be utilized for time and frequency synchronization, channel estimation, cell selection, equalization, and channel decoding. In addition, the present invention may be so configured that the preamble data includes information on the general physical channel and information on a reception node to demodulate the relevant physical channel signal.

That is, the present invention may be so configured, as shown in FIG. 1I, that the reception node can check whether the physical channel information and the physical channel data are the data transmitted to itself through acquisition and combination of ID (or value or data) of the preamble. That is, the reception node can prevent unnecessary power consumption causable by unnecessary operations by omitting a subsequent demodulation of physical channel data, when it is presumed through detection of the preamble ID that the physical channel data is not a data relevant to itself.

The preamble data of the present invention may be configured in the form shown in FIG. 12, as one of the exemplary embodiments. That is, the preamble data ($ID_C$) may indicate physical channel information, where the physical channel information may be configured by including information on a broadcasting channel, a control channel, and a data channel.

In addition, the preamble data ($ID_G$) may indicate reception node group information, where the reception node group information may be configured by including information on all reception node groups and four mutually different reception node groups. Furthermore, the preamble data ($ID_M$) may indicate the reception node information, where the reception node information may be configured by including information on all the reception nodes within relevant receiving group and nine mutually different reception nodes. The preamble data thus constructed may constitute the preamble data for transmission by being respectively inserted into the preamble positions shown in FIG. 11. Therefore, necessary reception node indication information may be obtained when the physical channel information, the reception node group information, and the reception node information are combined.

As an example, when there are a total of $N_C$ number of mutually different physical channels, and there are a total of $N_G$ number of reception node groups and a total of $N_M$ number of reception nodes in each reception node group, the total number of reception nodes will be in the number of $N_G * N_M$.

In this case, the total required number of preamble IDs will be in the number of $N_C*(N_G+1)*(N_M+1)$. Here, the reason for considering $(N_G+1)$ and $(N_M+1)$ instead of $N_G$ and $N_G$ is to indicate all groups and all reception nodes in each group.

Thus, the preamble $ID_P$ may be configured by a combination of $ID_C$, which is a physical channel ID, $ID_G$, which is a reception node group ID, and $ID_M$, which is a reception node ID. In case where there is no reception node group, the preamble $ID_P$ may be configured by a combination of $ID_C$, which is a physical channel ID, and $ID_M$, which is a reception node ID.

Furthermore, the preamble must select a preamble that satisfies the following condition when there are a total of K preambles and the number of IDs that can be provided for each preamble is M1, M2, . . . , Mk.

$$M1*M2* \ldots *Mk \geq N_C*(N_G+1)*(N_M+1)$$

The following equation may be applied in order to generate a preamble $ID_P$ according to an exemplary embodiment of the present invention.

$$ID_P=ID_M*(N_G+1)*N_C+ID_G*(N_C)+ID_C.$$

where $ID_P$ may be determined as under by $ID_M$, $ID_G$, and $ID_C$, when $N_G=5$, $N_C=3$, and $N_M=10$.

A preamble ID may be generated by being set as $ID_P=ID_M*18+ID_G*3+ID_C$.

At this time, assuming that K=3, M1=2, M2=3, and M3=33 for selecting the preamble, each preamble ID has a value that satisfies the following condition, in the case of ni={0, 1, . . . , $M_1$−1}.

$$ID_P=n1*M2*M3+n2*M3+n3$$

$$=n1*99+n2*33+n3$$

Therefore, each preamble ID generation and selection shown in FIG. 13 may be controlled through the following exemplary embodiment.

The broadcasting channel may be such that a preamble ID of $ID_P=0$ is generated by the formula $ID_P=ID_M*18+ID_G*3+ID_C$ when $ID_C=0$, $ID_G=0$ and $ID_M=0$, and when this is applied to the formula of $ID_P=n1*99+n2*33+n3$, the preamble ID of n1=0, n2=0 and n3=0 may be selected.

Through the above process and formulae, the control channel transmitted to all the reception nodes of the reception node group where the group ID of 2 may be such that $ID_P=7$, when $ID_G=2$, $ID_M=0$ and I $ID_C=1$, and n1=0, n2=0, n3=7.

The data channel transmitted to the reception node, where, reception node whose group ID is 3, and reception node whose reception node ID is 8, may be such that $ID_P=155$, when $ID_G=3$, $ID_M=8$ and $ID_C=2$, and n1=1, n2=1, n3=23.

In the case of a control channel transmitted to a reception node having a reception node ID of 4 in all reception node groups, $ID_P=73$ when $ID_G=0$, $ID_M=4$, $ID_C=1$, and n1=0, n2=2, and n3=11.

Accordingly, it becomes possible to generate and select a preamble ID when a plurality of physical channel information, a plurality of reception node groups, and a plurality of reception nodes are combined through a predetermined algorithm.

FIG. 12 is a block diagram of a portion of a transmission side for transmitting physical channel information configured by including a physical channel information and reception node information to demodulate the physical channel signal in a preamble in the underwater communication according to the present invention.

The present invention may include a physical channel determination unit (500) for determining a physical channel for transmission in a plurality of physical channels used for underwater communication, a reception node group determination unit (501) for determining a relevant reception node group from among a plurality of reception node groups, and a reception node determination unit (502) for determining a relevant reception node in a plurality of reception nodes. A signal (value) determined by and outputted from the said unit may be inputted into a preamble ID generator (504), and the preamble ID may be generated through an algorithm stored in the preamble ID generator (504). Furthermore, the ID of generated preamble may be provided to a preamble selection unit (506). The preamble selection unit (506) may select and output a preamble through the pre-set algorithm using the preamble ID value.

Meanwhile, when the reception node is determined and a physical channel for transmission is determined, a signal based on the physical channel determined by a physical channel signal generation unit (503) may be generated. Furthermore, the selected preamble may be inserted into the physical channel signal at the preamble insertion unit (503). Through this process, a preamble may be inserted into the physical channel signal to form a frame data mapped as the OFDM symbol, and the frame data thus constructed may be transmitted according to the OFDM method.

In other words, FIG. 13 shows a configuration in which a preamble ID is generated using a plurality of physical channels, a plurality of reception node groups, and a plurality of reception nodes. At this time, the control of the physical channel determination unit (500), the reception node group determination unit (501), and the reception node determination unit (502) may be implemented through control of a control unit (not shown), and the control of the control unit may be implemented by a to-be-transmitted signal, a reception node to receive the to-be-transmitted signal, and a control algorithm. The control unit may use a control unit included in the central node or may additionally include a separate control unit.

Although the preamble ID generator (504) may be exemplarily implemented by the foregoing exemplary embodiment, it should be apparent that the preamble ID generator (504) may be variably generated using physical channel information, reception node group information, and reception node information through other algorithms. Likewise, although the preamble selection unit (506) may be exemplarily implemented by the foregoing exemplary embodiment, the preamble selection unit (506) may be variably generated by other algorithms.

That is, some configurations in the transmission side shown in FIG. 13 may be included in the node used as the transmission side for the forward communication in the centralized network underwater communication such as the central node or the underwater base station. Moreover, configurations for control and configuration of the preamble data of present invention, and control for signal processing according to the OFDM method may be included in the transmission side. Similarly, control structures for controlling and demodulating the preamble data and for signal processing according to the OFDM method may be also included in the node of receiving side. For example, the transmission side and the receiving side must have a rule for generating a common preamble ID. The transmission side and the receiving side must have a rule for selecting a common preamble. These rules are naturally formed to decode a signal transmitted from the transmission side to an original signal. These controls, necessary control algorithms or storage of rules may be realized using the control unit and the memory included in the respective transmission side notes and reception node sides.

Next, when a transmission signal including physical channel information is transmitted from a central node through forward communication through the above process, a signal may be received by a plurality of reception node sides. FIG. 14 illustrates an operational configuration diagram implemented by the receiving side according to the present invention.

When the underwater communication starts, a preamble may be detected in the centralized network underwater communication from the reception signal where all the reception nodes are received from the forward communication through the transceiver unit (40) for synchronization in the physical layers (600).

Moreover, the controller (32) may acquire a preamble ID from the detected preamble (601), and obtain, from the obtained preamble ID, a physical channel ID, a reception node group ID, and a reception node ID (602, 603, 604).

In the case where the physical channel information is a broadcasting channel, all the reception nodes perform a process of demodulating the physical channel signal because of the data being sent to all the reception nodes collectively (605, 606).

However, in the case where the physical channel information is not a broadcasting channel, a process of demodulating operation of the physical channel signal may be implemented only by the reception node where the thus-obtained reception node group ID and reception node ID are identical (607, 608).

Furthermore, a plurality of reception nodes having different reception node IDs may omit a process of demodulating operation for the subsequent physical channel signals (609). Subsequent to 608 and 609, when the reception signal is received and demodulating operation is continuously performed, the process may be returned to 600, and the process may be terminated when all operations are completed.

The foregoing detailed description should not be construed in any way as being restrictive and should be considered as examples. The scope of the present invention should be determined by rational interpretation of the appended claims, and all changes within the scope of equivalents of the present invention are included in the scope of the present invention.

[Description of Reference Numerals]

| | |
|---|---|
| 10: sensor node | 20: central node |
| 21, 22, 40: transceiver unit | 23, 26, 36: data transmission unit |
| 24, 25, 38: data receiving unit | 27: frequency divider |
| 28, 32: controller | 29, 34: memory |
| 50: underwater communication network | 62: ground communication network |
| 64: management node | |

The invention claimed is:

1. A method for sending signals of underwater communication, in a centralized network underwater communication using a central node collecting detection information from a plurality of reception nodes for detecting underwater information and transmitting the same to a ground network, the method comprising:

setting, by the central node, a lowest frequency band in an entire useable frequency band as a frequency band for forward communication;

forming to include physical channel information and reception node information for demodulating the physical channel information in a preamble of a frame data for transmission;

transmitting, by the central node, a signal using the set frequency band;

determining, by the plurality of reception nodes, whether the physical channel information of the preamble is its own data by receiving a signal and combining preamble values included in the frame data, and conducting, only by the reception node including its own data, the data demodulating operation as a result of the determination.

2. The method of claim 1, wherein the forming step includes forming by combining a plurality of physical channel information, a plurality of reception node group information, and a plurality of reception node information.

3. The method of claim 1, wherein the forming step includes forming by combining a plurality of physical channel information and a plurality of reception node group information.

4. The method of claim 1, wherein the transmitting step includes applying a method of carrying away data on a plurality of carrier waves.

5. An apparatus for sending signals for underwater communication, in a centralized network underwater communication using a central node collecting detection information from a plurality of reception nodes for detecting underwater information and transmitting the same to a ground network, the apparatus comprising:

a frequency setting module allowing the central node to set a lowest frequency band in an entire useable frequency band as a frequency band for forward communication;

a forming module a forms by including physical channel information and reception node information for demodulating the physical channel information in a preamble of a frame data for transmission;

a transmission module allowing the central node to transmit a signal using the set frequency band;

a reception node allowing a plurality of reception nodes to determine whether the physical channel information of the preamble is its own data by receiving a signal and combining preamble values included in the frame data; and a demodulation module allowing only the reception node to conduct the data demodulation operation including its own data as a result of the determination.

6. The apparatus of claim 5, wherein the forming module further comprises:

a unit for determining an arbitrary physical channel from a plurality of physical channels;

a unit for determining an arbitrary reception node group from a plurality of reception node groups;

a unit for determining an arbitrary reception node from a plurality of reception nodes;

a preamble generator for generating a preamble value by combining the physical channel, the reception node group, and the reception node; and a preamble insertion unit for inserting the preamble into a physical channel signal.

7. An apparatus for sending signals for underwater communication, in a centralized network underwater communication using a central node collecting detection information from a plurality of reception nodes for detecting underwater information and transmitting the same to a ground network, the apparatus comprising:

a frequency setting module allowing the central node to set a lowest frequency band in an entire useable frequency band as a frequency band for forward communication;

a forming module that forms by including physical channel information and reception node information for demodulating the physical channel information in a preamble of a frame data for transmission;

a transmission module allowing the central node to transmit a signal using the set frequency band;

a unit for determining an arbitrary physical channel from a plurality of physical channels;

a unit for determining an arbitrary reception node group from a plurality of reception node groups;

a unit for determining an arbitrary reception node from a plurality of reception nodes;

a preamble generator for generating a preamble value by combining the physical channel, the reception node group, and the reception node; and a preamble insertion unit for inserting the preamble into a physical channel signal.

* * * * *